E. M. TAYLOR.
MEANS FOR THE MANUFACTURE OF OPTICAL LENSES.
APPLICATION FILED MAR. 21, 1916.

1,199,719.

Patented Sept. 26, 1916.
2 SHEETS—SHEET 2.

Inventor
Ernest Miles Taylor
Attorney

UNITED STATES PATENT OFFICE.

ERNEST MILES TAYLOR, OF LONDON, ENGLAND.

MEANS FOR THE MANUFACTURE OF OPTICAL LENSES.

1,199,719.  Specification of Letters Patent.  Patented Sept. 26, 1916.

Application filed March 21, 1916. Serial No. 85,565.

*To all whom it may concern:*

Be it known that I, ERNEST MILES TAYLOR, a subject of Great Britain and Ireland, residing at London, in the county of London, England, have invented new and useful Improvements in Means for the Manufacture of Optical Lenses, of which the following is a specification.

This invention relates to tools or appliances for the manufacture of optical lenses, and is particularly applicable to that kind of lens intended for spectacles and eyeglasses.

It has for its object to provide improved means whereby a block or piece of glass, pebble or other suitable material (hereinafter referred to as "lens-material") may have imparted to it a predetermined variable surface, or surfaces, of optical accuracy on one or both sides thereof.

The block or piece of lens-material hereinbefore referred to, may be of one piece, or may be composed of cemented, grooved, or otherwise attachable sections built up for the purpose, of precisely similar or other refractive index, and partly worked or otherwise.

Heretofore it has been well known to rough grind, smooth grind, and polish, lenses for spectacles and eyeglasses, by machinery as well as by hand, and to operate upon the curvatures of one, two, or more lenses simultaneously, and I do not intend that such should be considered as in any way forming part of my invention, which, as stated above, has for its objects the provision of improved tools or appliances, whereby such results may be obtained in a more efficient, economical, and expeditious manner.

In the accompanying drawings:—

Figure 1:
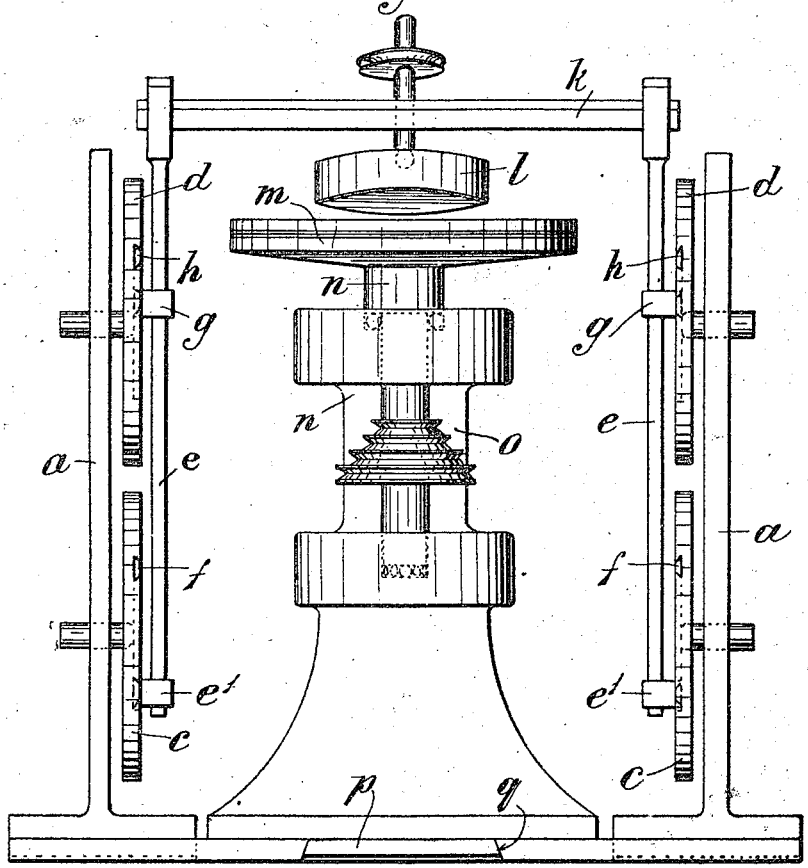
Figure 2:
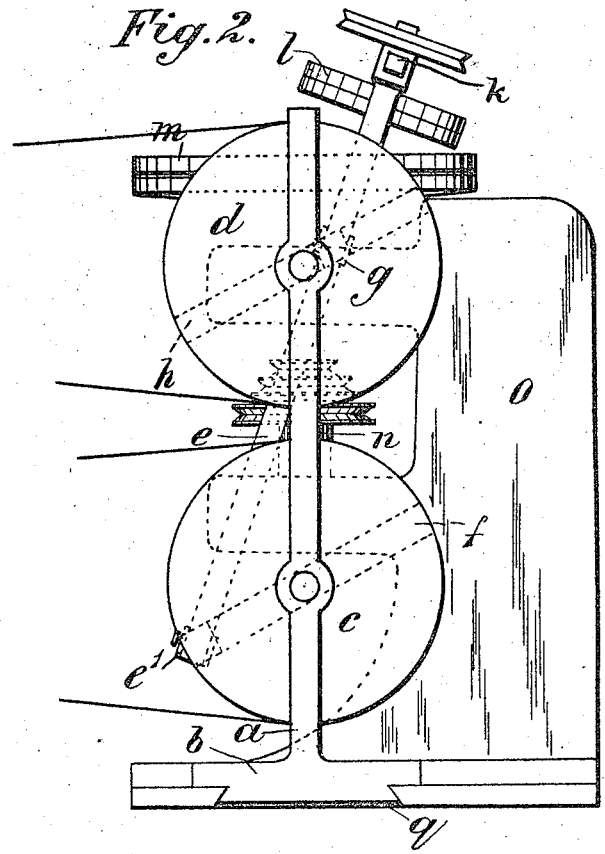
Figure 3:
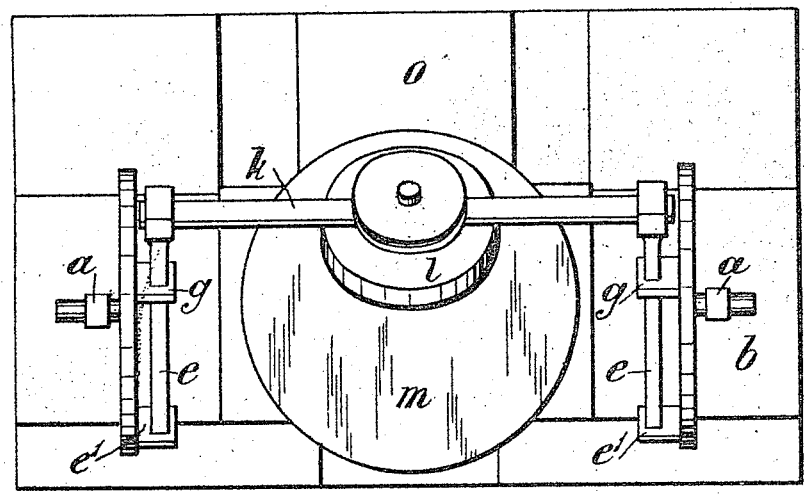

Figures 1 and 2 show respectively in front and side elevation one arrangement of apparatus constructed according to my invention. Fig. 3 is top view of the device when in the position shown in Fig. 2.

A standard $a$ upon a base $b$ supports pivotally carriers $c$ and $d$ preferably of disk-like construction, as shown, which may be oscillated or rotated about their pivots in any known manner, such as by belts (see Fig. 2). The arm $e$ is attached to a block $e'$ which slides and is free to rotate in the path or groove $f$ of the carrier $c$. The upper part of the arm $e$ is guided in the block $g$ slidably and rotatably disposed in the path or groove $h$ of the carrier $d$. Such arrangement or device (hereinafter when referred to as a whole, called "the curve-setter") carries, at the non-pivoted end of the arm $e$, a bearer $k$ upon which is mounted the tool, tool-device or tool-holder $l$ (hereinafter referred to as "the grinding-tool"), adapted for cutting, rough-shaping, grinding and polishing the lens-material upon which it operates. Such grinding-tool may be of brass, iron, felt, or other suitable material, circular in design, and having a suitable grinding edge. A greater degree of rigidity will be afforded the bearer $k$ by providing duplicate curve-setters at either end thereof. Preferably operating below such grinding-tool $l$ is the lens-holder $m$ on a rotatable shaft $n$ carried by the standard $o$, which shaft may, if desired, be carried upon antifriction ball-bearings as shown.

$p$ is a rail, slot, or other suitable adjustable means, in or upon the bedplate $q$, for supporting and permitting movement of standard $o$ and shaft $n$.

The *modus operandi* is as follows: The direction of the arm $e$ being, at any moment, determined by the position of the controlling slot, or slide $g$ relatively to the pivot-point $e'$ the successive positions through which the grinding-tool-face is actuated, are determined by the direction and speed of motion or state of rest of the carrier $d$ and slide $g$ relatively to that of the carrier $c$, and pivot-point $e'$. The lens-material, therefore, having been secured in position on the lens-holder $m$; the curve-setter adjusted and its movement directed to carry the grinding-tool $l$ through the path desired; the relative positions and movements of the curve setter and standard $o$ being determined to insure proper contact of grinding-tool with lens-material; motion is then imparted by flexible shaft, belt-drive, speed-gear, or other suitable drive, to such curve-setter carriers, $c$ and $d$, shaft $n$ and grinding-tool $l$; causing the surface of the lens-material to gradually assume, under continued pressure, the like curvature to the curve of the path through which the grinding tool is actuated.

It will be seen that the throw of the curve setter may first be adjusted to grind the outermost portion of a piece of lens-material and may then be gradually adjusted to move the grinding tool inward toward the center of the lens material. Moreover, by suitably adjusting the curve setter the grinding-tool may be made to operate over an outer circle at one curvature and over other circles at different curvatures.

What I claim is:—

1. In a device for grinding lenses the combination comprising a base, pairs of carriers revolubly mounted thereon, blocks slidably disposed on said carriers, arms pivoted to one of said blocks and slidably guided by the other block of a pair of carriers, a tool bearer carried by said arms, a grinding tool mounted upon said tool bearer and a work holder below said tool bearer.

2. In a machine for grinding lenses, the combination comprising a base, a work holder mounted thereon, carriers revolubly mounted on said base, blocks slidably disposed on said carriers, an arm pivotally mounted on one of said blocks and guided by a block upon another carrier, a tool bearer carried by said arm, a tool revolubly mounted on said bearer, and means for rotating said carriers.

3. In a machine for grinding lenses, the combination comprising a work holder, a tool bearer, an arm supporting said bearer, a movable pivot to which said arm is attached, a movable guide member in slidable engagement with said arm, and means for moving said pivot and guide member.

In testimony whereof I have signed my name to this specification in the presence of two subscribing witnesses.

ERNEST MILES TAYLOR.

Witnesses:
 M. J. McDERMOTT,
 JAMES G. STOKES.